(12) United States Patent
Muetzel et al.

(10) Patent No.: US 9,092,914 B2
(45) Date of Patent: Jul. 28, 2015

(54) VEHICLE EFFICIENCY AND DEFECT RECOGNITION BASED ON GPS LOCATION

(71) Applicant: ZF Friedrichshafen AG, Friedrichshafen (DE)

(72) Inventors: Ronald Muetzel, Hawthorn Woods, IL (US); Thomas Roesch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/925,460

(22) Filed: Jun. 24, 2013

(65) Prior Publication Data

US 2014/0379205 A1    Dec. 25, 2014

(51) Int. Cl.
*G01M 17/00* (2006.01)
*G07C 5/00* (2006.01)
*G07C 5/08* (2006.01)

(52) U.S. Cl.
CPC .. *G07C 5/00* (2013.01); *G07C 5/08* (2013.01); *G07C 5/0808* (2013.01)

(58) Field of Classification Search
CPC ........ G07C 5/0816; B60Q 9/00; B62D 41/00; G01C 21/26; G08G 1/09626
See application file for complete search history.

(56) References Cited

U.S. PATENT DOCUMENTS

| 6,161,071 | A | * | 12/2000 | Shuman et al. | 701/48 |
| 2007/0001831 | A1 | | 1/2007 | Raz et al. | |
| 2008/0004764 | A1 | * | 1/2008 | Chinnadurai et al. | 701/29 |
| 2012/0136802 | A1 | * | 5/2012 | McQuade et al. | 705/347 |
| 2014/0074345 | A1 | * | 3/2014 | Gabay et al. | 701/31.4 |

FOREIGN PATENT DOCUMENTS

| DE | 10 2006 043 317 A1 | 3/2008 |
| DE | 10 2009 034 214 A1 | 4/2010 |

OTHER PUBLICATIONS

Search Report issued in corresponding DE Appin. No. 10 2014 211 985.5 on Mar. 9, 2015 (6 pgs) (German Language).

* cited by examiner

*Primary Examiner* — Mussa A Shaawat
*Assistant Examiner* — Abdhesh Jha
(74) *Attorney, Agent, or Firm* — Brinks Gilson & Lione

(57) ABSTRACT

Apparatuses and methods are described for detecting vehicle efficiency and recognizing a vehicle defect. A vehicle operating parameter may be measured and recorded at a specific vehicle location. The measurement may be compared to prior measurements of the same operating parameter at the same location previously recorded for the same vehicle or a comparable vehicle. A vehicle defect may be detected where the measurement shows a statistical deviation from previous measurements. The vehicle's operator, owner, lessee, or lessor may be notified of the defect.

16 Claims, 3 Drawing Sheets

VEHICLE EFFICIENCY AND DEFECT RECOGNITION BASED ON GPS LOCATION

BACKGROUND OF THE INVENTION

1. Field of the Invention

The invention relates to vehicle efficiency and defect recognition based on a vehicle's position that may be determined using the global positioning system ("GPS").

2. Related Art

Vehicles often suffer faults due to latent defects in the vehicle such as cracked or otherwise damaged components. These defects may be manufacturing defects or may manifest over time through vehicle use. A fault may occur while the vehicle is in operation, and may cause serious injury to the vehicle operator or other persons. The fault may also cause serious damage to property and may result in a delayed delivery of goods or services if the vehicle is operating as a commercial carrier or in another commercial capacity.

Some vehicles include sensors or gauges that may be able to identify defects before a fault occurs. For example, temperature and oil pressure sensors and gauges may alert a vehicle operator that the engine is overheating or that oil pressure is low. In this case, the vehicle operator may be able to avoid a catastrophic fault by bringing the vehicle to a service center to locate and resolve the defect or issue causing the engine to overheat or the oil pressure to remain low. However, not all defects are so easily detectable. In some cases, a latent defect may remain undetectable by sensors or the vehicle operator until the defect results in a fault or complete failure of the vehicle. Thus, there is a need for a way to detect defects in a vehicle, particularly where the defect is latent and may potentially cause a catastrophic failure in the vehicle.

SUMMARY OF THE INVENTION

The descriptions below include apparatuses and methods for detecting vehicle efficiency and recognizing a vehicle defect. A vehicle operating parameter may be measured and recorded at a specific vehicle location. The measurement may be compared to prior measurements of the same operating parameter at the same location previously recorded for the same vehicle or a comparable vehicle. A vehicle defect may be detected where the measurement shows a statistical deviation from previous measurements. The vehicle's operator, owner, lessee, or lessor may be notified of the defect.

A fault detection system comprises a first input configured to receive a location of a vehicle; a second input configured to receive a first measurement of an operating parameter of the vehicle at the location; and a processor in communication with the first input and the second input, the processor configured to determine whether there is a fault condition associated with the vehicle based on the first measurement, the location of the vehicle, and at least one additional measurement of the operating parameter, wherein the at least one additional measurement is made at the location previous to the first measurement.

A fault detection apparatus comprises a first input configured to receive a location of a vehicle; a second input configured to receive a first measurement of a first operating parameter of the vehicle at the location; and a processor in communication with the first input and the second input, the processor configured to determine whether there is a fault condition associated with the vehicle based on the first measurement, the location of the vehicle, and at least one additional measurement of a second operating parameter, wherein the at least one additional measurement is associated with the location, and wherein the at least one additional measurement is made prior to the first measurement.

A method of detecting a fault within a vehicle comprises receiving a location of the vehicle; receiving a measurement of an operating parameter of the vehicle; and comparing the location and measurement with a profile to determine whether a fault exists with the vehicle, wherein the profile is stored on a computer-readable medium and comprises at least one measurement of at least one operating parameter of the vehicle; and a location for each of the at least one measurement of at least one operating parameter of the vehicle.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system and method of operating the system of the present application may be more fully understood by reading the following description in conjunction with the drawings, in which.

DETAILED DESCRIPTION

The described embodiments may be used to recognize a vehicle defect or a vehicle inefficiency based on a comparison of the vehicle's operation at a given location with previous records of the vehicle's operation at the same location. A comparison to similar vehicles may also be used to detect a defect or determine vehicle inefficiency. As a vehicle travels along a route, measurements of the vehicle's operating parameters are recorded along with the vehicle location that corresponds with each recorded measurement. In this way, a log of the vehicle's performance at a known location is created. Entries in the log may be compared with a log or a series of logs for the same vehicle for previous trips along the same route. Alternatively, or additionally, the log may be compared with a log or a series of logs for other vehicles that have previously travelled the route. The other vehicles may be the same make, model, and type as the vehicle. Or, the other vehicles may be comprised of different makes, models, and types. In the latter case, the measurements in the logs may be compensated or adjusted for a more accurate comparison between the two vehicles.

A comparison of current measurements with previous measurements recorded at a given location may show that the vehicle has suffered a malfunction, defect, or other issue that is diminishing vehicle efficiency. For example, if the speed of an automobile is fifteen percent lower at a given location on a current trip versus a previous trip, then the automobile's engine may be damaged. The comparison may take into account, for example, the vehicle's weight and throttle position, and external factors, such as wind speed and direction, to reduce the likelihood of a false positive detection of a deficiency. An indication may be made to the vehicle operator that there may be a defect in the vehicle that is causing the apparent deficiency. The indication may also be transmitted via a network to a remote server that may be monitored by the vehicle's owner or maintainer.

Figure 1:
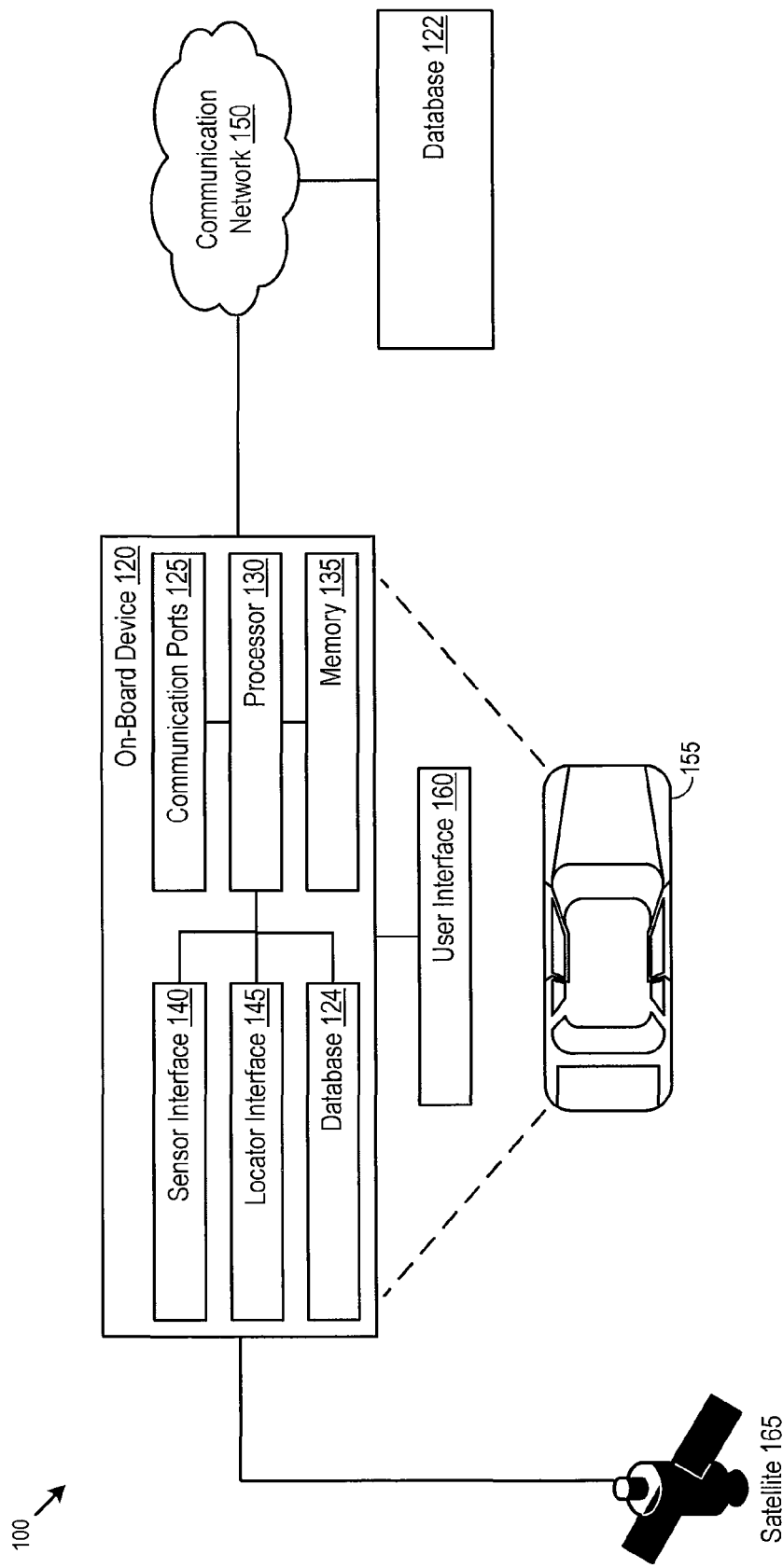
FIG. 1 is a block diagram of a defect recognition system.

FIG. 1 illustrates a block diagram of defect recognition system 100 according to one embodiment of the invention. Defect recognition system 100 includes vehicle 155. The exemplary vehicle 155 shown in FIG. 1 is an automobile. However, vehicle 155 may take any number of forms, including, as examples, a bus, truck, van, mini-van, sports utility vehicle (SUV), helicopter, airplane, construction vehicle, boat, trailer, all-terrain vehicle (ATV), motorcycle, moped, tractor, hybrid vehicle, electric vehicle, ambulance, marine vessel, boat, submarine, or other vehicle.

Vehicle 155 may include user interface 160, which may be communicatively linked to on-board device 120. Vehicle 155 may also include one or more occupants, e.g., a driver, one or more passengers, or any combination thereof. On-board device 120 may include communication ports 125, a processor 130, database 124, memory 135 that may store instructions or data, sensor interface 140, and locator interface 145.

On-board device 120 may communicate with any number of communication networks, including communication network 150, which may take any number of forms such as a cellular network. On-board device 120 may communicate according to any number of communication protocols, standards, networks, or topologies. As examples, on-board device 120 may communicate across cellular networks or standards (e.g., 2G, 3G, Universal Mobile Telecommunications System (UMTS), GSM (®) Association, Long Term Evolution (LTE) (™), or more), WiMAX, Bluetooth, WiFi (including 802.11a/b/g/n/ac or others), WiGig, Global Positioning System (GPS) networks, and others available at the time of the filing of this application or that may be developed in the future. On-board device 120 may include processing circuitry, data ports, transmitters, receivers, transceivers, or any combination thereof to communicate across any of the above-listed protocols, standards, networks, or topologies.

On-board device 120 may also communicate with any number of communication devices operated by occupants in vehicle 155. In one embodiment, on-board device 120 may implement a local area network (LAN) accessible by occupant communication devices, which may take the form of a wireless LAN (WLAN) or a wireless access point. Communication devices, such as hand-held smart phones, mobile phones, tablets, laptops, or other devices, may communicate directly with on-board device 120 through the WLAN. Alternatively, on-board device 120 may communicate with occupant communication devices indirectly, e.g., through one or more external communication networks, such as communication network 150, which may be a cellular network.

On-board device 120 may be configured according to any number of user requirements with respect to communication capabilities, data transfer configurations, data collection configurations, and other configurations. On-board device 120 may also collect any vehicle data, such as performance statistics, route information, position data, traffic data, and others. In one example, on-board device 120 may include telemetry functionality to collect and/or send vehicle data. These telemetry functions may include measurements or records of speed, direction, acceleration, pitch, yawl, and roll, and measurements or records of rate of change for speed, direction, acceleration, pitch, yawl, and roll. One example of on-board device 120 is the Openmatics© on-board unit provided by ZF Friedrichshafen AG.

On-board device 120 includes sensor interface 140 that may interface with one or more sensors in the vehicle. These sensors may include pressure sensors, gyroscopes, temperature sensors, voltage and current monitors, magnetic sensors, microelectromechanical sensors, mechatronic sensors, position sensors, and compass sensors. These sensors are merely exemplary and the embodiments are not limited to those sensors listed herein. Via sensor interface 140, on-board device 120 may collect various operating parameters that may be stored in database 124, memory 135, or transmitted over communication network 150 and stored in database 122.

Database 122 may be operated or maintained by the owner of vehicle 155. Alternatively, database 122 may be operated or maintained by a third-party that may grant access to database 122 to commercial or private operators and owners of vehicles. Database 122 may be distributed, such as in a cloud of distributed, networked computer servers.

On-board device 120 also includes locator interface 145. Locator interface 145 may be a GPS receiver that is able to receive transmissions from GPS satellites providing the vehicle with a means to determine its location on the earth. The GPS coordinates may be used together with a map software to provide the vehicle and its occupants with an indication of where the vehicle is located along a roadway, waterway, or anywhere on a map provided by the map software. Locator interface 145 may receive GPS transmissions from satellite 165.

In a typical application, on-board device 120 may be used as follows to detect a defect in a vehicle. As vehicle 155 travels along a route, on-board device 120 is tracking the location of vehicle 155 using GPS. GPS signals from satellite 165 may be received via locator interface 145. At specified intervals, on-board device 120 records GPS coordinates of vehicle 155. On-board device 120 also records measurement data for various operating parameters of vehicle 155. On-board device 120 receives measurement data via sensor interface 140, or may also receive measurement data produced by any sensors that are provided directly within on-board device 120. On-board device 120 may also receive measurement data from remote sensors via communication ports 125 and/or communication network 150.

The various operating parameters of the vehicle may include, for example, speed, velocity, direction of travel, acceleration, throttle position, brake pedal position, temperature of components in the vehicle, ambient temperature, pressure and/or levels of vehicle fluids (both liquids and gases), vehicle weight, occupancy, measurements of the vehicle's electrical system, fuel efficiency, exhaust measurements, noise measurements, and wind speed. These operating parameters listed are merely exemplary.

On-board device 120 associates a location with the operating parameter measurement that was recorded when the vehicle was at that location. Thus, on-board device 120 may create a log of locations and corresponding measurements as the vehicle travels along a route. This log is stored in database 124 or memory 135, or is uploaded to database 122 over communication network 150.

On-board device 120 may record such logs for each trip of vehicle 155. As is often the case, vehicle 155 may travel the same route several times. For example, an operator of vehicle 155 may travel the same commute to work each day in vehicle 155. Over time, several logs corresponding to the operator's commute will be generated and stored. Similarly, a commercial operator of vehicle 155, or, for example, a long-hauling truck may travel the same route along interstate freeways. Each trip along the freeway may be logged, creating a database of measurements corresponding to the routes travelled by the vehicle. As stated above, the measurements may be stored in database 124, memory 135, or database 122.

If vehicle 155 is traveling along a route that vehicle 155 previously travelled, on-board device 120 may retrieve the logs corresponding to that route for that vehicle. As vehicle 155 travels along the route for the nth time, on-board device 120 collects measurements of operating parameters and the corresponding location (e.g., in GPS coordinates) for each measurement. During this time, on-board device 120 may compare the log for the current trip with those logs from previous trips. On-board device 120 may perform an analysis of the data to determine whether there are any anomalies in the current log as compared to past logs. For example, if the fuel efficiency of vehicle 155 is suddenly far lower than on previous trips, vehicle 155 may have suffered a defect or malfunction. On-board device 120 may compensate for certain factors, such as vehicle weight, throttle position, wind velocity (speed and direction), and vehicle speed, to prevent or reduce the occurrence of false positive identifications of defects or inefficiencies. Alternatively, on-board device 120 may upload the relevant data via communication network 150 to a remote server or processor to perform the analysis of the recorded operating parameters.

On-board device 120 may also consider recorded operating parameters at locations along a given route of other vehicles. For example, if vehicle 155 is traveling along a new route for which no logs exist for vehicle 155, on-board device 120 may access logs for other vehicles that have travelled the route for comparison with the operating parameters of vehicle 155. On-board device 120 may advantageously access logs for vehicles having, for example, the same make, model, type, and approximate mileage as vehicle 155. Alternatively, on-board device 120 may access logs for broader groups of vehicles that include vehicles of a make, model, type, and/or approximate mileage that is different from those of vehicle 155. On-board device 120 or some other device, such as a server or processor in communication with communication network 150, may perform a compensation calculation on the logs of other vehicles so that the comparison with the log from vehicle 155 is more meaningful. For example, individual logs for vehicles of other types may be compensated based on the weight and horsepower of the vehicles. Heavier vehicles or vehicles with greater horsepower may have lower fuel efficiency. Fuel efficiency data from vehicles that are heavier than vehicle 155 should be compensated given the weight difference. Such a comparison may be particularly useful for identifying defects when the fuel efficiency of a lighter vehicle is worse than the fuel efficiency of a heavier vehicle with greater horsepower.

The advantage of the location-based defect detection system is the recognition of an issue, inefficiency, or defect before a catastrophic failure occurs. For example, vehicle 155 may have suffered a cracked axle that has not failed completely and is still functioning such that the cracked axle is not apparent to the vehicle operator. However, the cracked axle may be causing certain anomalies in the performance of vehicle 155. Vehicle 155, for example, may have lower fuel efficiency. The cracked axle may be causing a noise or vibration that may be audible or inaudible, and in any event, detectable by vibration sensors or microphones in vehicle 155.

As vehicle 155 travels along a route that it has previously travelled, on-board device 120 may be logging the operating parameters of vehicle 155 as discussed above. On-board device 120 may also be comparing the log with previously-record logs from previous trips along the same route. On-board device 120 may detect the change in fuel efficiency, vibrations, and noise caused by the cracked axle. On-board device 120 may also consider the ambient conditions, such as wind speed or temperature. On-board device 120 may collect data via sensor interface 140 or from the World Wide Web or the Internet via communication network 150. On-board device 120 may then consider all data collected to determine whether there is a defect in vehicle 155. For example, an increase in noise and/or vibrations, or a decrease in fuel efficiency may indicate that a defect exists. On-board device 120 may further attempt to discover the location of the defect and any other details about the defect based on the data collected and analyzed. This is advantageous because it may allow the vehicle operator or owner to quickly locate the defect and have it remedied before a catastrophic event occurs due to the defect. For example, the cracked axle may be repaired before it completely fails and causes serious injury to the operator and others, and before it renders vehicle 155 completely inoperable.

On-board device 120 may alternatively transmit the necessary data to another server or processor to perform the analysis. Further, on-board device 120, or whichever device performs the inefficiency and defect recognition analysis, may transmit the analysis results of whether a defect or inefficiency has been detected to the vehicle operator of vehicle 155, for example, by way of user interface 160. Or, the analysis results may be transmitted to a server, processor, handheld device, or personal computer to be displayed on a monitor, website, or user interface. In this way, persons other than the operator of vehicle 155 may track vehicle 155 as it travels along a route. For example, the operator of a large commercial fleet of vehicles may be able to monitor all of its vehicles in the field. Efficiencies and cost-savings may be achieved by detecting defects and inefficiencies early using the described embodiment and repairing vehicle 155 as necessary.

A user of system 100 that seeks to monitor the status of vehicle 155 and other vehicles may receive communications about the status of the vehicles based on their location and operating parameters. Such communications may include a text message, an image file, a video file, an e-mail, an audio file or sound, or other communications.

On-board device 120 may perform statistical analysis of the data collected for various operating parameters of vehicle 155. For example, on-board device 120 may compute the mean, median, and standard deviation of a set of measurements for a given operating parameter. The set may be limited to measurements that were recorded when the vehicle weight was within a predetermined range. Other vehicle parameters may also be accounted for when computing such statistical values. For example, statistical values may be computed for a set of measurements recorded when vehicle 155 is within ten percent of 300 kilograms. Other boundaries or thresholds, such as ambient temperature and wind speed and direction, may be used to limit the set of measurements from which statistical values are calculated. A set of forces acting on vehicle 155 may be considered as predetermined boundaries for validating the statistical values.

When vehicle 155 is operating under conditions that validate a set of statistical values, the current measured operating parameters may be compared against the statistical values to determine whether a defect or inefficiency exists in vehicle 155. For example, if the vehicle 155 has a speed of 60 miles per hour with a throttle position of 40 degrees at its current location, then the vehicle's speed-to-throttle ratio may be compared against the mean speed-to-throttle ratio at the current location. If the speed-to-throttle ratio is greater than a predetermined number of standard deviations from the mean, then a defect or inefficiency caused by a defect may be recognized. Other statistical analyses may be performed to detect defects. For example, data may be adjusted, compensated, or normalized based on external and internal forces acting on vehicle 155 to improve the accuracy of the comparison. The advantage of adjusting, compensating, or normalizing data and measurements based on such variables, for example, as vehicle weight or ambient temperature, is to make the comparison of prior logs to the current log more accurate and meaningful, i.e., so that the system is comparing "apples to apples" and "oranges to oranges."

Figure 2:
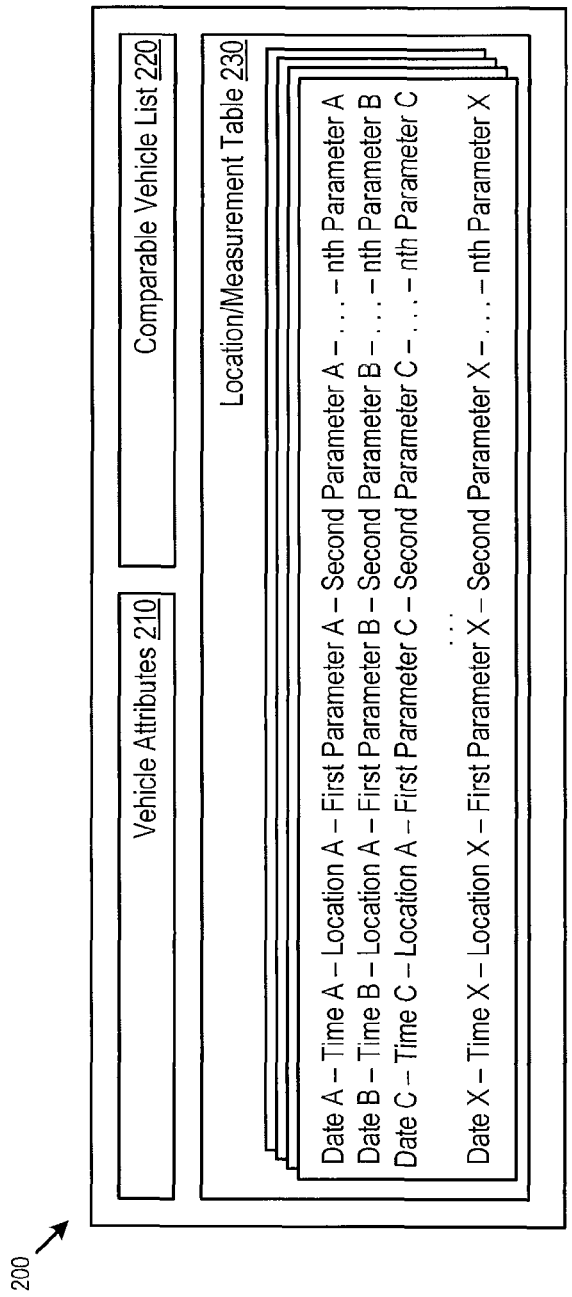
FIG. 2 is a block diagram of a vehicle profile used in a defect recognition system.

FIG. 2 depicts vehicle profile 200 used in a defect and inefficiency recognition system according to one embodiment of the invention. Vehicle profile 200 may be stored in database 124, memory 135, or database 122. Vehicle profile may be used in the determining whether a defect or fault condition exists in a vehicle based on the vehicle's given location, its current operating parameters, and measurements of operating parameters recorded at the same location on a prior trip of the vehicle.

Vehicle profile 200 comprises information fields including vehicle attributes 210 and comparable vehicle list 220. Vehicle profile 200 also includes location/measurement table 230. Vehicle attributes 210 may be an array or table of vehicle attributes including, for example, vehicle weight, size, make, model, type, volume, coefficients of friction for various surfaces of the vehicle, horsepower, and other attributes of vehicles. Vehicle attributes 210 may be populated at the time that the vehicle is manufactured, or may be updated periodically or randomly following a characterization of the vehicle attributes. For example, vehicle attributes 210 may be measured, updated, or determined when the vehicle undergoes a routine maintenance procedure.

Comparable vehicle list 220 is a field that includes information about what types of vehicles may be compared to the vehicle having vehicle profile 200. Comparable vehicle list 220 may be an array or list of vehicle makes, models, or types. Comparable vehicle list 220 may also include compensation or normalization data that permits a one-to-one comparison of two otherwise different vehicles. For example, if vehicle 155 has vehicle profile 200, comparable vehicle list 220 may include a list of vehicles that are the same as, or comparable to, vehicle 155. For those vehicles that are merely comparable to vehicle 155, comparable vehicle list 220 may include conversion factors or other constants that may be used to adjust the measured operating parameters for a vehicle listed in comparable vehicle list 220 enabling a meaningful, one-to-one comparison to vehicle 155.

Comparable vehicle list 220 may also include addresses or links to logs for the comparable vehicles for routes that those individual vehicles have travelled. This is advantageous where vehicle 155 may be at a location that a comparable vehicle has also been to. In this case, data for the comparable vehicle associated with that location may be retrieved using the address or link contained in comparable vehicle list 220. The address may point to a local server located in the vehicle or a remote server accessible by a communications network. The link may point to a linked list containing logs of measured operating data and associated location coordinates in vehicle profile 200.

Location/measurement table 230 includes rows of entries that begin with a date, e.g., "Date A," a time, e.g., "Time A," and a location, e.g. "Location A." The date and time are recorded when the vehicle is at the recorded location. For example, when the vehicle arrives at "Location A," then "Date A" and "Time A" are recorded in the row with "Location A." The location may be expressed as latitude and longitude coordinates or coordinates of another type that may be associated with a map or grid. The location may also be expressed as an address, point of interest, freeway exit or mile marker, or crossroads. Each location in a row is associated with several measurements or records of operating parameters of a vehicle, e.g., "First Parameter A" and "Second Parameter A." These are operating parameters, e.g., vehicle speed, and conditional observations, e.g. wind speed, as discussed above. The recorded parameters are thus associated with a date, time, and location of their recordation. Each row is entered in location/measurement table 230 at a specific location. The frequency of recording a new location and corresponding set of data may be periodic, e.g., every thirty seconds. Alternatively, the frequency may be based on distance traveled, e.g., a new row is entered for every mile travelled. A vehicle operator or owner may also send a command instructing a system to add a new row to location/measurement table 230. This may be advantageous where an operator has identified a particular location that she often travels through. Location/measurement table 230 may comprise several logs, each log associated with an individual trip, a specific date, or a range of dates.

Based on the description above, vehicle profile 200 may be constructed and/or added to over time. Vehicle profile 200 may be stored, for example, in on-board device 120, or may be stored on a remote server, handheld device, removable media, or any electronic storage medium. Vehicle profile 200 may be accessed by a processor associated with the vehicle having profile 200, or may be accessible by other processors associated with other vehicles. This is advantageous where vehicles of a same or similar type seek to compare their operating parameters with those of a vehicle associated with vehicle profile 200. In this way, each vehicle may have its own profile that is shared with defect and inefficiency recognition systems for other vehicles.

Figure 3:
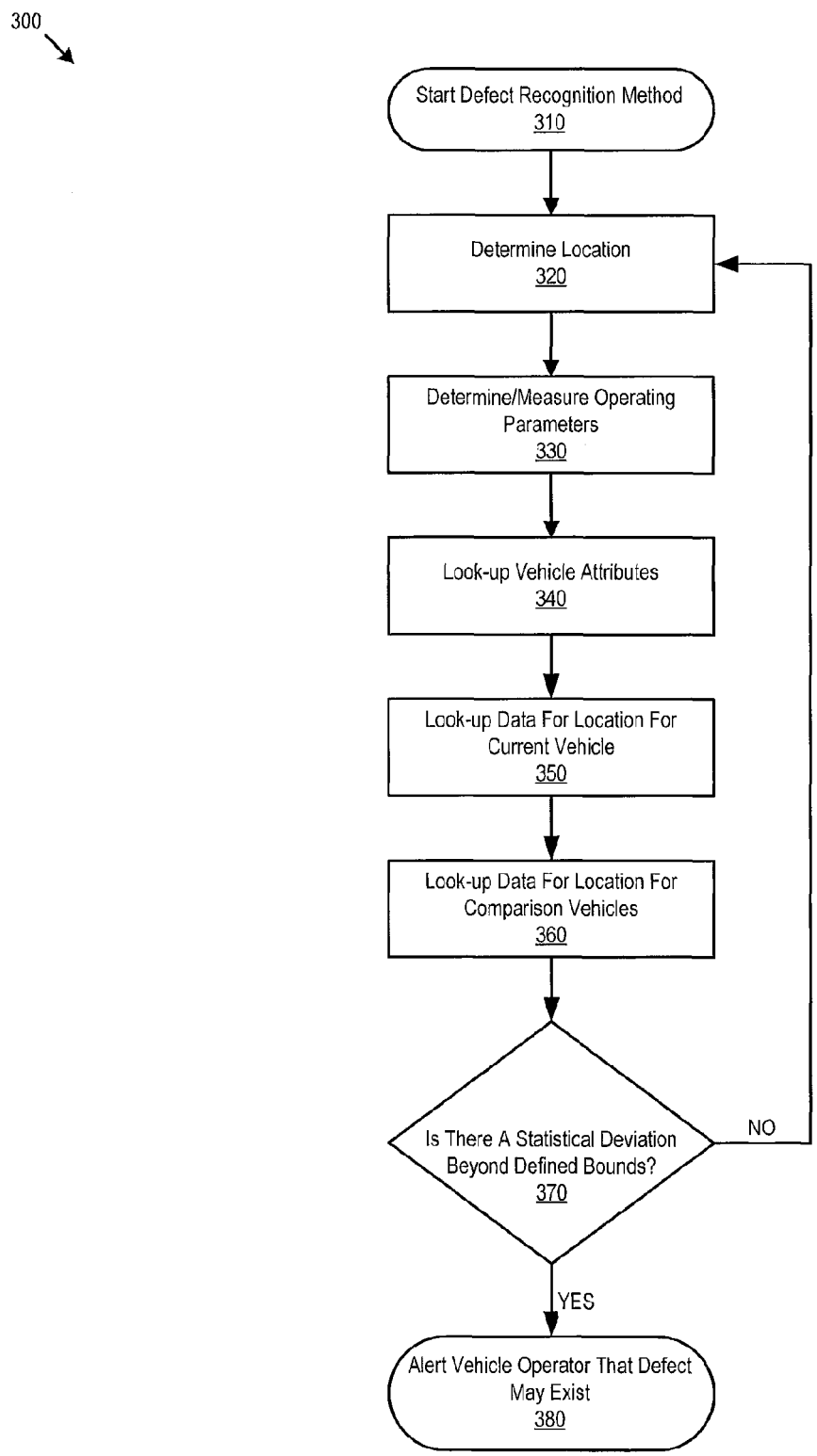
FIG. 3 is a flow diagram of a method for detecting a vehicle defect.

FIG. 3 depicts a flow diagram of method 300 for detecting a vehicle defect according to another embodiment of the invention. Method 300 begins at step 310 when an operator or system seeks to recognize any fault, defect, or inefficiency in a vehicle. In step 320, the location of the vehicle is determined, for example, using GPS. Next, certain operating parameters are measured or otherwise determined in step 330. The location of step 320 is associated with the measurements of step 330. In step 340, the vehicle's attributes are retrieved or otherwise determined. In step 350, data previously recorded for the current vehicle at the current location is retrieved. There may or may not be such data depending on whether the current vehicle has travelled through the current location. In step 360, data recorded for comparison vehicles while operating at the current location is retrieved. The comparison vehicles may be selected based on the vehicle attributes retrieved in step 340. In step 370, the measured data for the current vehicle at the current location is compared with the previously recorded data at the current location. Data from comparison vehicles may be adjusted or compensated to account for differences between the current vehicle and the comparison vehicle(s). Statistics are generated from the previously recorded data. For example, the mean, median, and standard deviation may be computed for a given measured operating parameter. The current data and the previous data—which may be represented statistically—are then compared. If the current data statistically deviates from the previous data past a certain threshold, for example, past two standard deviations, then the vehicle may have suffered a defect. In step 380, the vehicle operator is alerted that a defect may exist in the vehicle. If there is no statistical deviation, or the statistical deviation is within defined bounds, then the method returns to step 320. There may be a delay before step 320 is performed again. For example, a time delay or a delay based on the distance travelled may be used to determine when to continue with step 320. In this manner, method 300 is repeated while the vehicle is operating until a defect is detected, or until method 300 is otherwise halted.

Methods or processes may be implemented, for example, using a processor and/or instructions or programs stored in a memory. Specific components of the disclosed embodiments may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, databases, and other data structures may be separately stored and managed, may be incorporated into a single memory or database, or may be logically and physically organized in many different ways. Programs or instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A fault detection system comprising:
a first input configured to receive a location of a vehicle;
a second input configured to receive a first measurement of an operating parameter of the vehicle at the location; and
a processor in communication with the first input and the second input, the processor configured to determine whether there is a fault condition associated with the vehicle based on the first measurement, the location of the vehicle, and at least one additional measurement of the operating parameter,
wherein the at least one additional measurement is made at the location at a time prior to the first measurement; wherein the processor is further configured to determine whether there is a fault condition associated the vehicle based on a series of additional measurements of the operating parameter of the vehicle; wherein the processor is further configured to perform a statistical analysis on the series of additional measurements, and to compare a result of the statistical analysis with the first measurement to determine whether there is a fault condition associated with the vehicle; wherein the processor is further configured to detect a fault with the vehicle when the first measurement is a predetermined distance from a mean of the series of measurements; wherein the fault condition is indicative of a failing component of the vehicle.

2. The fault detection system of claim 1 wherein the location is expressed in latitude and longitude coordinates.

3. The fault detection system of claim 1 wherein the processor is further configured to determine whether there is a fault condition associated with the vehicle based on a statistical parameter calculated from the at least one additional measurement.

4. The fault detection system of claim 3 wherein the statistical parameter is any one of a mean, median, or standard deviation.

5. The fault detection system of claim 1 wherein the vehicle is a first vehicle, and the at least one additional measurement of the operating parameter is at least one additional measurement of the operating parameter of a second vehicle.

6. The fault detection system of claim 5 wherein the processor is further configured to determine whether there is a fault condition associated with the first vehicle based on a statistical parameter calculated from the at least one additional measurement.

7. The fault detection system of claim 5 wherein the processor is further configured to select the at least one additional measurement of the operating parameter of a second vehicle as the basis to determine whether there is a fault condition associated with the first vehicle based on a comparison of a first value associated with the first vehicle and a second value associated with the second vehicle.

8. The fault detection system of claim 7 wherein the first value is selected from a group consisting of size, weight, volume, manufacturer, age, and mileage of the first vehicle, and the second value is selected from a group consisting of size, weight, volume, manufacturer, age, and mileage of the second vehicle.

9. A fault detection apparatus comprising:
a first input configured to receive a location of a vehicle;
a second input configured to receive a first measurement of a first operating parameter of the vehicle at the location; and
a processor in communication with the first input and the second input, the processor configured to determine whether there is a fault condition associated with the vehicle based on the first measurement, the location of the vehicle, and at least one additional measurement of a second operating parameter,
wherein the at least one additional measurement is associated with the location, and
wherein the at least one additional measurement is made at a time prior to the first measurement; wherein the processor is further configured to determine whether there is a fault condition associated the vehicle based on a series of additional measurements of the operating parameter of the vehicle; wherein the processor is further configured to perform a statistical analysis on the series of additional measurements, and to compare a result of the statistical analysis with the first measurement to determine whether there is a fault condition associated with the vehicle; wherein the processor is further configured to detect a fault with the vehicle when the first measurement is a predetermined distance from a mean of the series of measurements; wherein the fault condition is indicative of a failing component of the vehicle.

10. The fault detection apparatus of claim 9 wherein the first input is configure to receive GPS coordinates.

11. The fault detection apparatus of claim 9 wherein the first operating parameter is different than the second operating parameter.

12. The fault detection apparatus of claim 9 wherein the at least one additional measurement is a series of measurements of the second operating parameter, and
wherein the first operating parameter is the same as the second operating parameter.

13. The fault detection apparatus of claim 12 wherein the processor is further configured to receive a statistical value associated with the series of measurements.

14. The fault detection apparatus of claim 12 wherein the processor is further configured to determine that the fault condition exists by comparing the statistical value with the first measurement,
wherein the fault condition is associated with the first operating parameter.

15. A method of detecting a fault within a vehicle, the method comprising:
receiving a first location of the vehicle;
receiving a measurement of an operating parameter of the vehicle at the first location; and comparing the first location and the measurement with a profile to determine whether a fault exists with the vehicle, wherein the profile is stored on a computer-readable medium and comprises:

a stored measurement of the operating parameter of the vehicle; and a stored location for the stored measurement of the first measurement; wherein the processor is further configured to determine whether there is a fault condition associated the vehicle based on a series of additional measurements of the operating parameter of the vehicle; wherein the processor is further configured to perform a statistical analysis on the series of additional measurements, and to compare a result of the statistical analysis with the first measurement to determine whether there is a fault condition associated with the vehicle; wherein the processor is further configured to detect a fault with the vehicle when the first measurement is a predetermined distance from a mean of the series of measurements; wherein the fault condition is indicative of a failing component of the vehicle.

16. The method of claim 15 wherein the vehicle is a first vehicle and the profile further comprises:

a second stored measurement of a second operating parameter of a second vehicle; and a second stored location for the second stored measurement of the second operating parameter of the second vehicle.

* * * * *